United States Patent
Schildgen

(10) Patent No.: US 7,777,153 B2
(45) Date of Patent: *Aug. 17, 2010

(54) CONNECTION BETWEEN TWO COMPONENTS

(75) Inventor: William R. Schildgen, Stacy, MN (US)

(73) Assignee: Medtronic, Inc., Minneapolis, MN (US)

( * ) Notice: Subject to any disclaimer, the term of this patent is extended or adjusted under 35 U.S.C. 154(b) by 225 days.

This patent is subject to a terminal disclaimer.

(21) Appl. No.: 11/861,018

(22) Filed: Sep. 25, 2007

(65) Prior Publication Data

US 2008/0067156 A1 Mar. 20, 2008

Related U.S. Application Data

(63) Continuation of application No. 10/968,677, filed on Oct. 19, 2004, now Pat. No. 7,288,736.

(51) Int. Cl.
*B23K 26/28* (2006.01)
*B23K 26/03* (2006.01)

(52) U.S. Cl. .................. 219/121.64; 219/103; 219/106

(58) Field of Classification Search ............ 219/121.63, 219/121.64, 121.83, 121.14, 121.46, 117.1, 219/137 R; 700/166; 228/103, 106
See application file for complete search history.

(56) References Cited

U.S. PATENT DOCUMENTS

| | | | | |
|---|---|---|---|---|
| 3,824,368 A | * | 7/1974 | Locke | .................. 219/121.64 |
| 4,521,668 A | * | 6/1985 | Osial et al. | ............. 219/121.64 |
| 5,902,326 A | * | 5/1999 | Lessar et al. | .................. 607/36 |
| 6,040,550 A | | 3/2000 | Chang | |
| 6,084,203 A | | 7/2000 | Bonigen | |
| 6,118,652 A | | 9/2000 | Casby et al. | |
| 6,492,618 B1 | | 12/2002 | Flood et al. | |
| 6,573,000 B1 | * | 6/2003 | Miyazaki et al. | ............ 429/185 |
| 6,750,421 B2 | * | 6/2004 | Hermann | ............... 219/121.64 |
| 2004/0191621 A1 | | 9/2004 | Heller | |
| 2005/0284919 A1 | | 12/2005 | Boyd | |

FOREIGN PATENT DOCUMENTS

JP 2002-103039 A * 4/2002
WO WO-02/92466 A1 * 11/2002

OTHER PUBLICATIONS

Machine translation of Japan Patent No. 2002-103399-A.*

* cited by examiner

Primary Examiner—Geoffrey S Evans

(57) ABSTRACT

A method of connecting two components includes providing an assembly including a first component and a second component, optically sensing a connection region between the first component and the second component to produce an image, defining a substantially elliptical path in a three-dimensional space based on the image, and initiating relative movement between the assembly and welding means such that the welding means is positioned, by relative movement, along the substantially elliptical path to produce a weld between the first component and the second component.

7 Claims, 15 Drawing Sheets

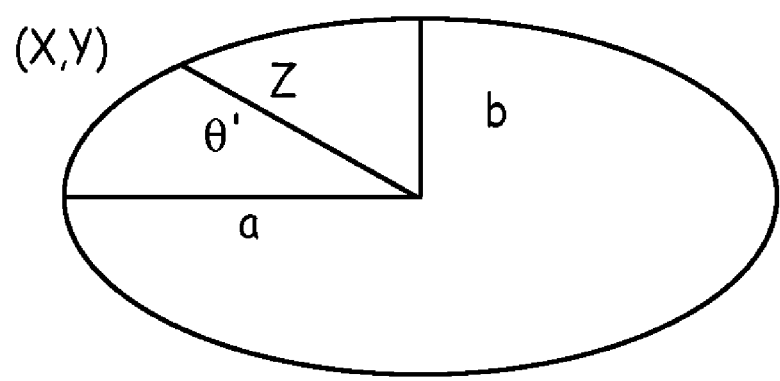
FIG. 14
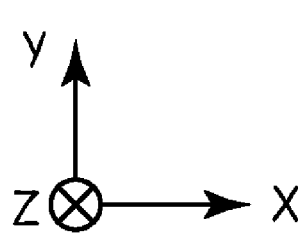

CONNECTION BETWEEN TWO COMPONENTS

CROSS REFERENCE TO PRIORITY APPLICATION

This application is a continuation of application Ser. No. 10/968,677, filed Oct. 19, 2004, now U.S. Pat. No. 7,288,736 which is incorporated by reference herein.

BACKGROUND OF THE INVENTION

It is often desired to connect components using welding to form a hermetically sealed connection. Medical devices, including encapsulated IMDs, frequently comprise a case structure (or similar component) and one or more fixtures, such as fillports for liquid electrolyte, electrical feedthroughs (e.g., multipolar and single-pin feedthroughs), ferrules, sensors, needles, nozzles, electrical connectors, and similar components, that establish electrical communication through the case with a hermetic seal.

Implantable medical devices (IMDs) include pacemakers, cardioverters, defibrillators, and other devices for therapeutic stimulation of the heart, as well as other devices such as implantable devices for administering drugs. Such devices can include a flat electrolytic capacitor (FEC), a wet valve metal-slug capacitor (e.g., a high energy wet tantalum capacitor), a primary or secondary battery, a drug pump, an infusion pump and the like. An example is the IMD set forth in U.S. Pat. No. 6,118,652 entitled "Implantable Medical Device Having Flat Electrolytic Capacitor With Laser Welded Cover."

In one application, one or more FEC stores energy required for defibrillation and other procedures performed by the medical device. An FEC typically includes an electrode assembly having an anode structure, a cathode, a separator (or spacer), an electrolyte (which can function as the cathode), and a case for enclosing the capacitor and containing the electrolyte. The capacitor stores energy in an electric field generated by opposing electrical charges on either side of an oxide layer formed on the anode. The energy stored is proportional to the surface area of the anode. The oxide layer is generally formed during electrolysis, where electrical current is passed through the anode.

Tabs or terminals can extend outside the case for electrically connecting the capacitor to external objects (e.g., to electrode coils disposed in electrical communication with myocardial tissue of a subject). Feedthroughs can be used to form electrical or other connections that extend through the FEC case.

A fillport is typically connected to the capacitor case during fabrication. The fillport permits a fluid, namely the electrolyte, to be introduced into the case at an appropriate stage during fabrication. Once the capacitor has been filled with electrolyte, the fillport can be cut or trimmed close to the case and then capped as part of a process of sealing the electrolyte within the capacitor. The capacitor utilizes hermetic seals for preventing fluids from the capacitor from leaking, which is impermissible when the medical device is implanted in a host body. In addition, hermetic seals help assure proper function of the capacitor and the medical device by limiting contamination and preventing necessary fluids from draining.

Known manufacturing processes for attaching two components with a hermetic seal present a number of problems and limitations. Typically when manufacturing medical devices, according to those known methods, fixtures such as fillports are placed at an opening on the case, protruding outward from the case. A flange on the fillport rests along an outer surface of the case and a sealing or connection portion of the fillport is situated within the opening. The fillport is typically temporarily held in place at the opening by gravity or a vacuum. The fillport and case are then welded together by creating a weld, often a laser weld, between the flange of the fillport and the exterior surface of the case. This weld resembles a lap joint. Welds formed between the flange on the fillport and the exterior of the case often exhibit poor weld penetration. The weld must penetrate three oxide layers, which are located on the flange of the fixture (i.e., top and bottom surfaces of the flange) and the exterior surface of the case. Welding though oxide layers is difficult.

In addition, these welds leave small gaps or crevices between the fillport and the case between the weld (on the exterior surface of the case) and an interior surface of the case. Stress points are formed at such gaps or crevices, which can result in poor weld and seal integrity. This can lead to a broken seal and also a broken connection, which are collectively referred to as weld failures. Furthermore, when the case contains a fluid, for example when the case is part of a FEC containing an electrolyte, fluid can collect within gaps and crevices between the fillport and the case (between the weld and the interior surface of the case), which causes processing issues, crevice corrosion, and exacerbates undesirable stresses at such locations.

Moreover, the fixture can become misaligned during manufacturing, leading to an improper connection and/or seal. With known manufacturing processes it is difficult to clamp or otherwise secure fixtures to a case component while welding. This makes it difficult to deal with misalignment problems.

Further, manufacturing processes are generally limited to manipulating a laser beam or other welding means from a position relative to the exterior surface of the case. In some instances the laser beam inadvertently impinges upon a portion of a component to be welded (e.g., an elongated fillport tube protruding toward the laser source), thus reducing yield and increasing scrap and costs related thereto.

Thus a more reliable sealed connection between two components, and a method of creating such a connection, is needed.

BRIEF SUMMARY OF THE INVENTION

The present invention relates to a method of connecting two components. The method includes providing an assembly including a first component and a second component, optically sensing a connection region between the first component and the second component to produce an image, defining a substantially elliptical path in a three-dimensional space based on the image, and initiating relative movement between the assembly and welding means such that the welding means is positioned, by relative movement, along the substantially elliptical path to produce a weld between the first component and the second component.

BRIEF DESCRIPTION OF THE DRAWINGS

FIG. 14 depicts an illustration of an ellipse.

DETAILED DESCRIPTION

The present invention relates to a connection between two components and a method of making such a connection. More particularly, the present invention relates to connecting two components, such as components of an IMD, by creating a hermetic seal with a weld.

Figure 1:
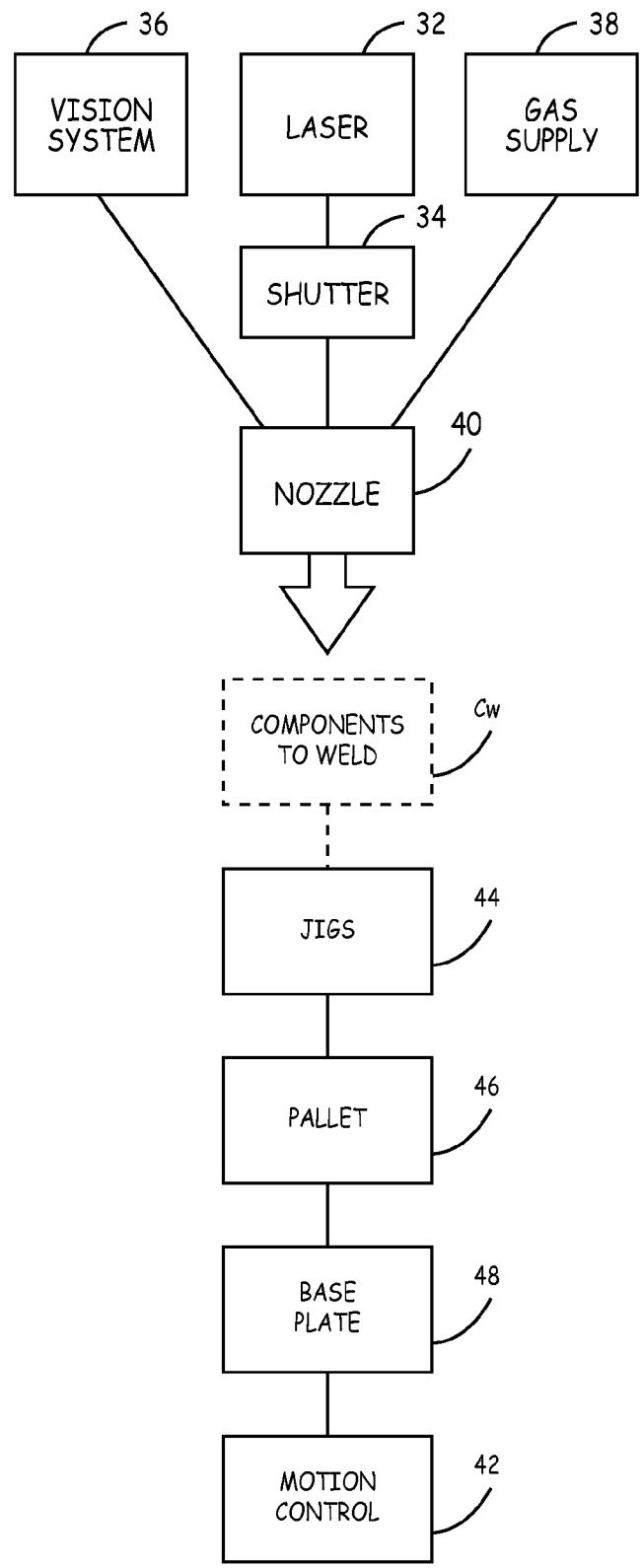
FIG. 1 depicts a block diagram of a laser welding system.

FIG. 1 depicts a block diagram of a laser welding system 30. The laser welding system 30 can include a laser 32, a shutter 34, a vision system 36, a gas supply 38, a nozzle 40, and a motion controller 42. One or more jigs 44 can be placed on a pallet 46, which in turn can be placed on a base plate 48. Components $C_w$ placed on the one or more jigs 44 can thereby be engaged by the laser welding system 30. It should be noted, however, that the laser welding system 30 shown and described with respect to FIG. 1 is one example, and other welding systems can be utilized according to the present invention.

The laser 32 is capable of generating laser beams, which can apply energy to a particular area for melting materials to form welds. The laser 32 can generate one or more discreet laser beams (e.g., by controlling laser pulses through current sent to the laser's 32 flash lamps) as pulses of energy, and the pulses are adjustable in pulse width (i.e., duration), pulse rate (i.e., frequency), and pulse height (i.e., beam intensity). The shutter 34 is a safety mechanism that can block all laser beams generated by the laser 32. Typically the shutter 34 has an on/off configuration, where the shutter 34 is either entirely open or entirely closed.

The vision system 36 optically senses characteristics of components $C_w$ engaged with the laser welding system 30. For example, the vision system 36 can be a pixel-based system that is capable of taking a "snapshot" of a portion of a component to weld $C_w$ and analyzing, inter alia, a geometry and position of features of that component $C_w$ based upon pixels of the "snapshot." A weld path can be determined using input and feedback from the vision system 36. The vision system 36 and the laser 32 can be focused together on a particular portion of the component to be welded $C_w$.

The gas supply 38 allows a cover gas, typically an inert gas like argon, helium and combinations of those elements, to be supplied when the laser 32 is creating a weld. Laser welding can generate oxides and soot that can rise off of welding path as a laser beam melts material on a component being welded $C_w$. Supplying a gas can reduce generation of particulate matter (oxides and soots), as well as reduce associated contamination. The gas can be supplied with an appropriate flow force to help dissipate a "cloud" of particulate matter generated during welding, as desired. The particular gas selected will vary according to characteristics of a particular application (e.g., according to material properties of the components to be welded $C_w$).

The laser 32, the vision system 34, and the gas supply 36 can all be routed through the nozzle 40. Typically the nozzle 40 is hollow and can be generally cone-shaped. A tip of the nozzle 40 is positioned in close proximity to components to be welded $C_w$. Generally, the nozzle 40 will be positioned to allow suitable clearance spacing between the nozzle 40 and the components to be welded $C_w$, such that the nozzle 40 does not physically contact the components to be welded $C_w$ despite any relative movements during welding. Physical contact can produce misalignment between the laser 32 and the components to be welded $C_w$.

As noted, gas can be supplied through the nozzle 40 co-axially with the laser beam from the laser 32. In further embodiments, gas can be supplied at different orientations, such as from an auxiliary location outside the nozzle 40 applying gas sideways (i.e., radially with respect to the nozzle 40). A desired orientation of supplied gas will vary according to characteristics of particular applications. For instance, a geometry of components to be welded $C_w$ can influence selection and provision of a more desirable gas supply.

The motion controller 42 permits X, Y and Z direction movement of base plate 48, and in turn, movement of the components to be welded $C_w$. Using the motion controller 42, relative movement of the laser 32 and the components to be welded $C_w$ can be initiated for positioning a laser beam from the laser 32 at a desired location on the components to be welded $C_w$ to make a weld.

Figure 2:
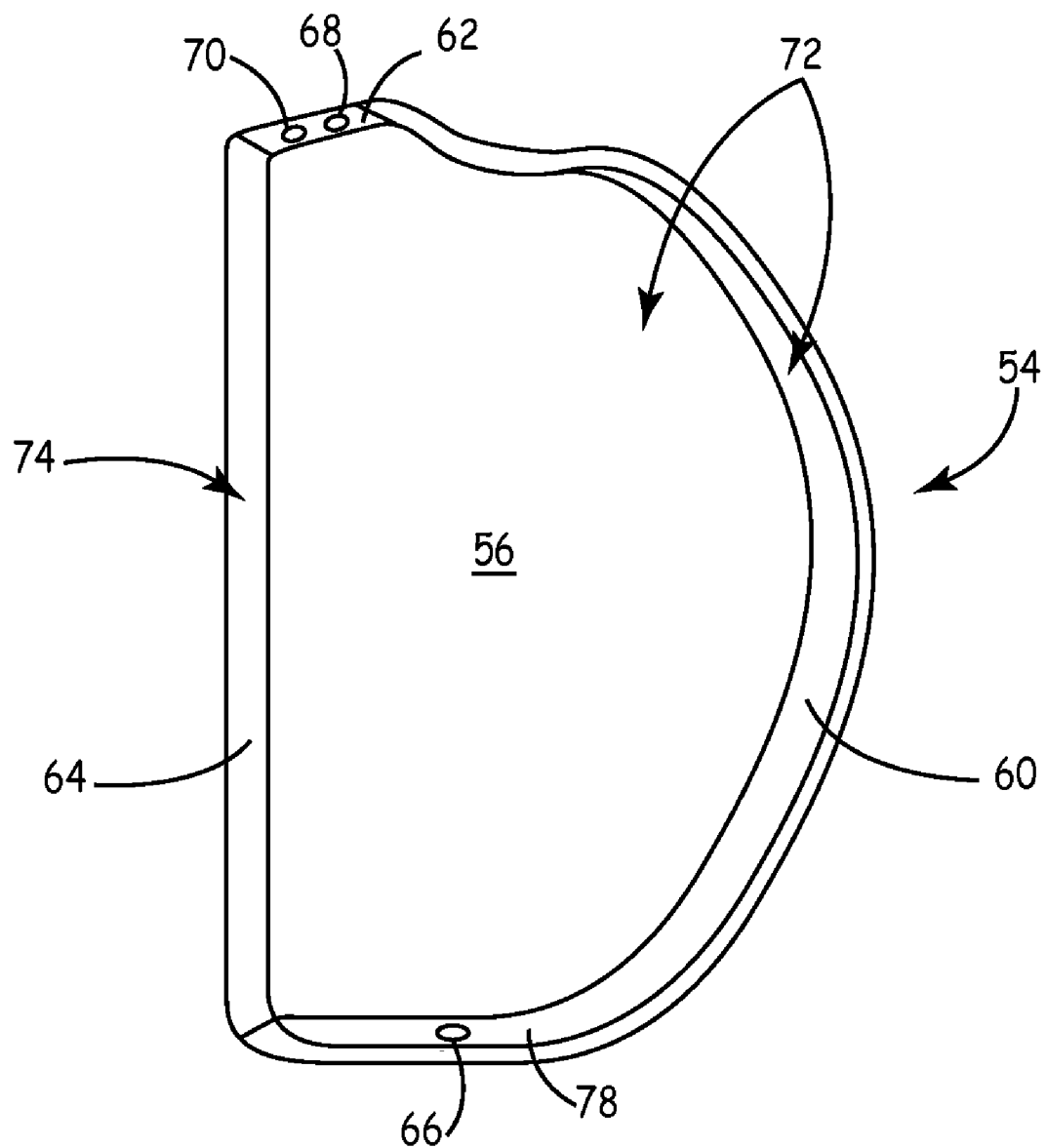
FIG. 2 depicts a perspective view of a case component.

FIG. 2 is a perspective view of a case component 54, which in this example is part of a flat electrolytic capacitor (FEC) case. In the embodiment shown in FIG. 2, the case component 54 includes a base 56 and a number of walls 58, 60, 62 and 64. A fillport opening 66 is disposed in the wall 58 of the case component 54. A first opening 68 and a second opening 70 are disposed in the wall 62.

The walls 58, 60, 62 and 64 are disposed at a perimeter of the base 56. Typically the walls 58, 60, 62 and 64 are arranged to extend from the base 56 in an orientation substantially perpendicular to the base 56, though other arrangements are possible. The base 56 and walls 58, 60, 62 and 64 form an open cavity therebetween. An interior surface 72 of the case 54 is defined along that cavity. An exterior surface 74 is further defined on the case 54, opposite the interior surface 72.

The case component 54 is typically made of aluminum, stainless steel, or titanium, but can be any laser-weldable material. Fixtures such as such as fillports, feedthroughs (e.g., multipolar and single-pin feedthroughs), ferrules, sensors, needles, nozzles, electrical connectors, and similar components can be connected to the case component 54 at any of the openings 66, 68 and 70.

The openings 66, 68, and 70 each have a generally circular shape, though other shapes are possible. The openings 66, 68, and 70 are typically positioned along the walls 58, 60, 62, and 64 of the case component 54 and extend through an entire thickness of material forming the case component 54. In further embodiments, the openings 66, 68, and 70 are positioned elsewhere on the case component 54.

Figure 3:
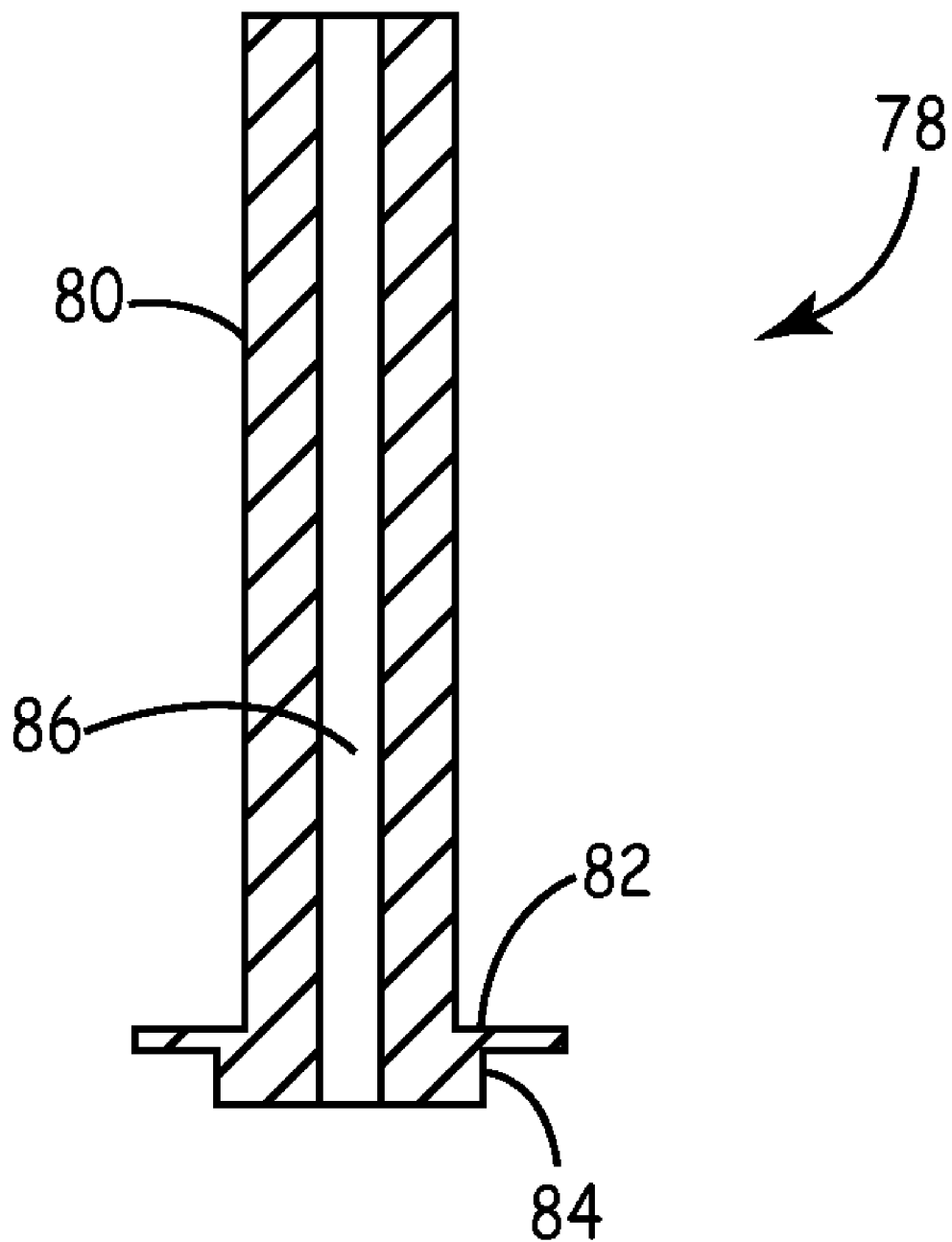
FIG. 3 depicts a cross-sectional view of a fillport.
Figure 4:
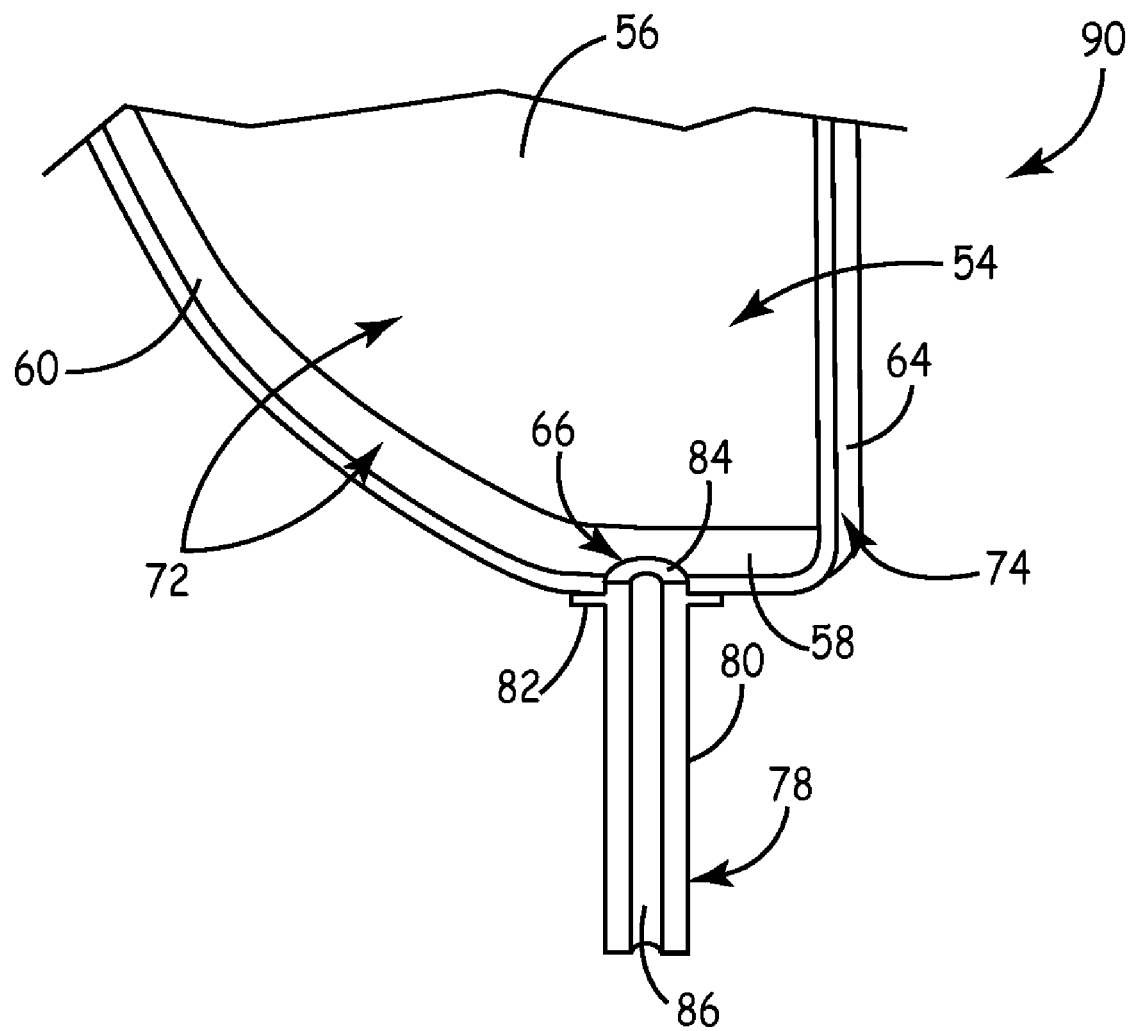
FIG. 4 depicts a perspective view of a cross-sectional portion of an assembly including a case component and a fillport.

FIG. 3 is a cross-sectional view of a fillport 78, which includes an axial shaft portion 80, a radially-extending flange portion 82, a connection portion 84, and an inner opening 86. The radially-extending flange portion 82 is adjacent to the axial shaft portion 80, and the connection portion 84 is located adjacent to the radially-extending flange portion 82 distal to the axial shaft portion 80. The inner opening 86 extends through the entire fillport 78, thereby defining a fluid path through the fillport 78. The fillport 78 can comprise any laser-weldable material, such as aluminum, stainless steel, titanium and other metals. In alterative embodiments, the fillport 78 can be a substantially straight tube without a flange. FIG. 4 is a perspective view of a cross-sectional portion of an assembly 90 including a case component 54 and a fillport 78, and prior to welding. As shown in FIG. 4, the assembly 90 has not yet been welded. The fillport 78 is positioned at an opening 66 in a wall 58 of the case component 54. A connection portion 84 of the fillport 78 is positioned within the opening 66 such that the connection portion 84 of the fillport 78 is substantially flush with an interior surface 72 of the case component 54. A radially-extending flange portion 82 of the fillport 78 is positioned adjacent an exterior surface 74 of the case component 54. An axial shaft portion 80 of the fillport 78 projects outward from the exterior surface 74 of the case component 54. An inner opening 86 of the fillport 78 is in fluid communication with a cavity defined by the case component 54.

Figure 5:
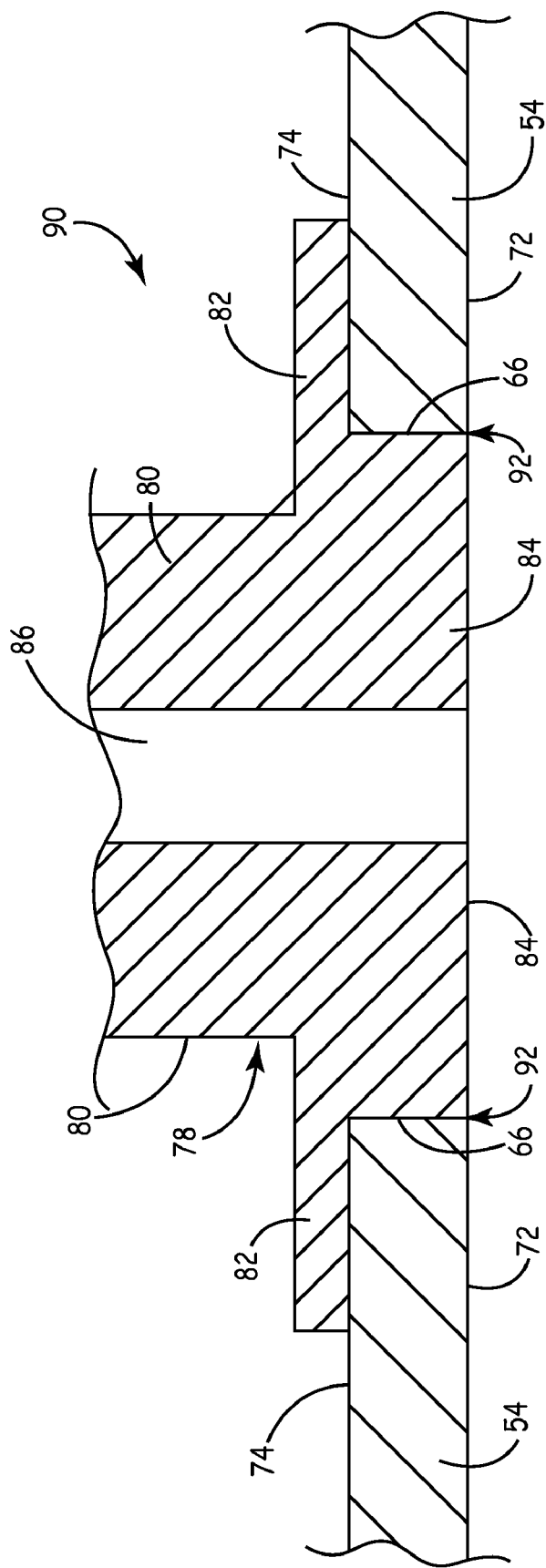
FIG. 5 depicts a cross-sectional elevation view of a portion of the assembly of FIG. 4.

FIG. 5 is a cross-sectional elevation view of a portion of the assembly 90 prior to welding. As shown in FIG. 5, a connection region 92 is defined where the fillport 78 and the case component 54 meet (i.e., at a joint area at a perimeter of the opening 66).

Figure 6:
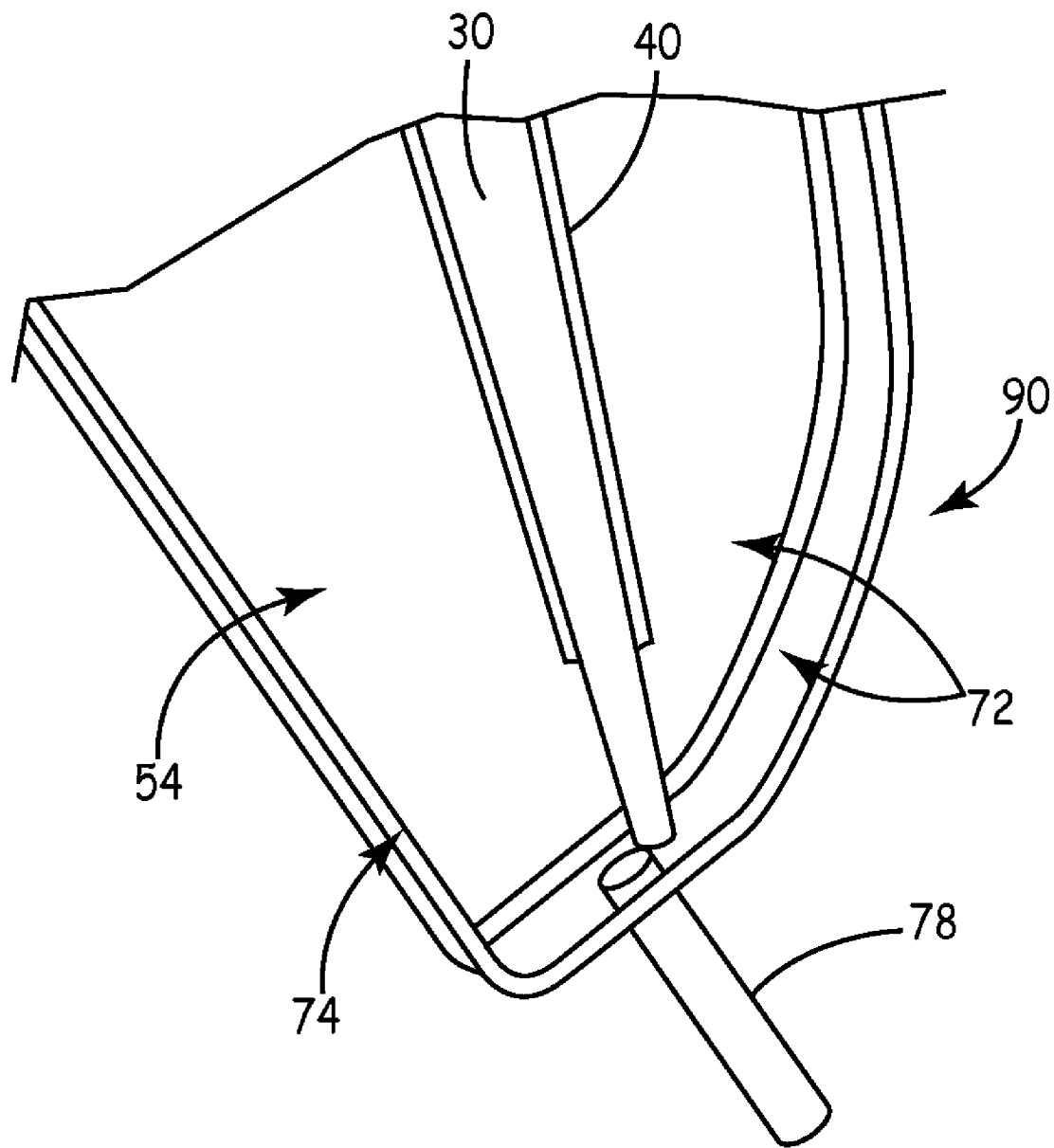
FIG. 6 depicts a perspective view of the assembly and a portion of a laser welding system.

FIG. 6 is a perspective view of the assembly 90 and a portion of a laser welding system 30 that includes a nozzle 40. The nozzle 40 is positioned in close proximity to the interior surface 72 of the case component 54. The laser welding system 30 generates a laser beam $L_B$ that can, according to a weld schedule, move along a weld path defined at or near the connection region 92 between the fillport 78 and the case component 54.

Figure 7:
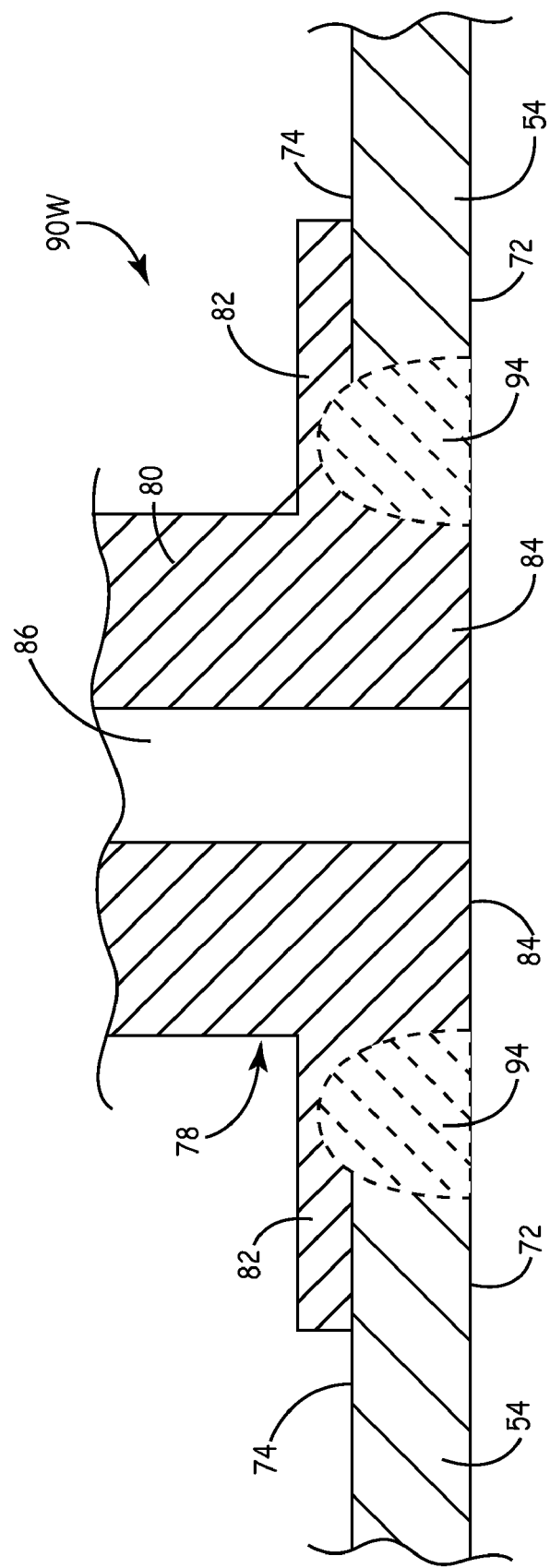
FIG. 7 depicts a cross-sectional view of a welded assembly.

FIG. 7 is a cross-sectional view of a welded assembly 90W, which corresponds to the unwelded assembly 90 shown and described with respect to FIGS. 4-6 after welding. As shown in FIG. 7, a weld 94 is disposed between the fillport 78 and the case component 54. The weld 94 extends from the interior surface 72 of the case component 54. A connection is made by the weld 94 that generally resembles a butt joint. A weld penetration depth (i.e., a distance the weld 94 extends from the interior surface 72) can vary. It is generally desired to increase the weld penetration depth without penetrating beyond a thickness of available material. For example, establishing a weld with penetration depth sufficient to extend into the radially-extending flange portion 82 of the fillport 78 without causing damage exterior portions of the radially-extending flange portion 82.

Figure 8:
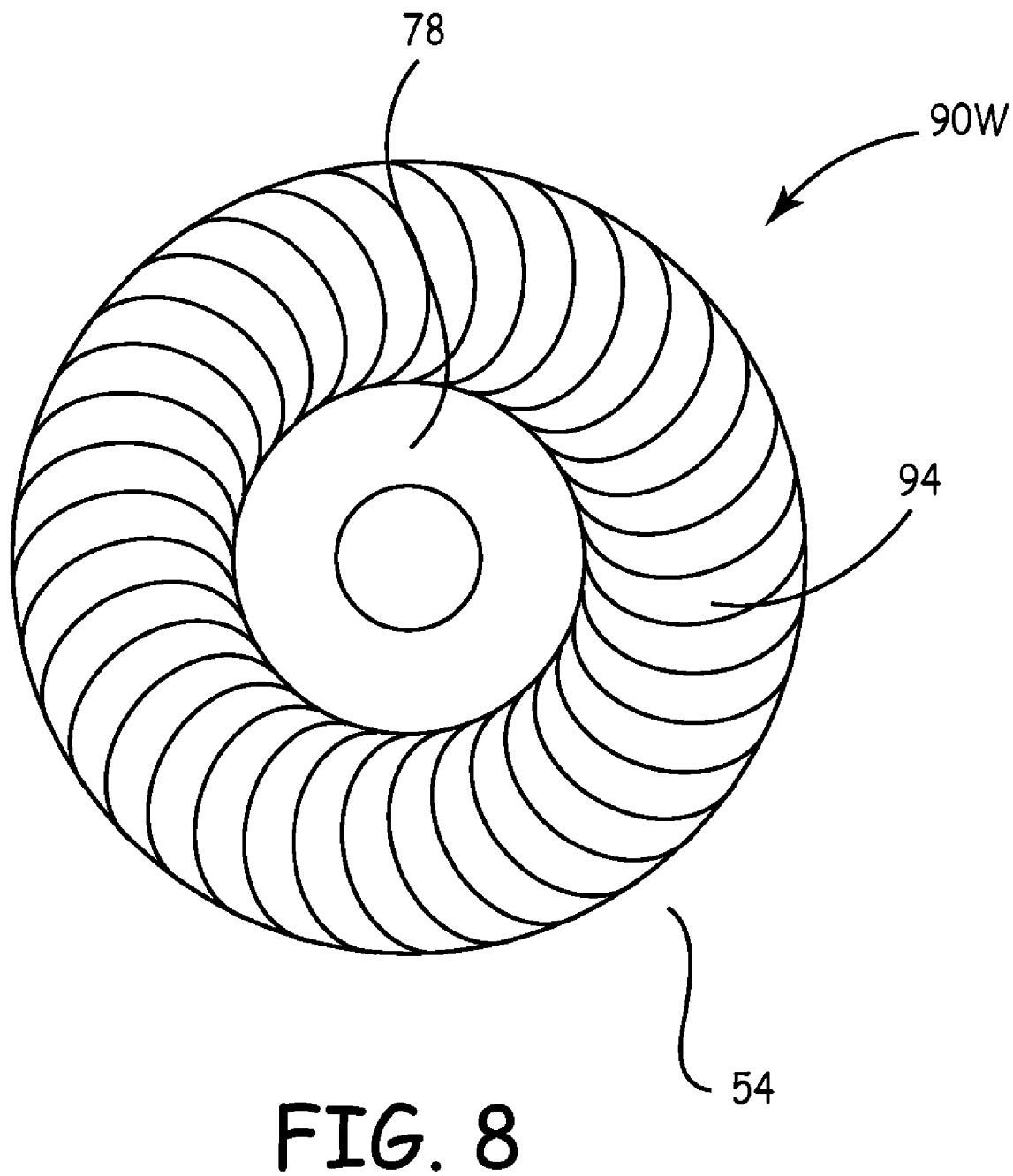
FIG. 8 depicts a bottom elevational view of the welded assembly of FIG. 7.

FIG. 8 depicts a bottom elevational view of the welded assembly 90W. As shown in FIG. 8, the weld 94 can comprise a plurality of discrete welding events (i.e., laser beam pulses) that collectively form the weld 94 in a substantially circular shape. In further embodiments, the weld 94 can be formed continuously. In one form of the invention, the weld 94 surrounds a pierceable septum (not depicted), which would be disposed on the interior of the fillport 78 portion so that the weld 94 hermetically seals a fluid-containing reservoir one interior surface of which would comprise case component 54. The septum is used to manually refill a drug reservoir of an implantable drum pump or infusion device, or the like. The septum can be formed of a variety of polymer or resin-based materials. Such materials preferably self-heal when a syringe tip is withdrawn.

The weld 94, shown in FIGS. 7 and 8, forms a sealed connection between the fillport 78 and the case component 54. That seal can be a hermetic seal. The weld 94 can further be formed such that no gaps or crevices are formed where the fillport 78 and the case component 54 are connected (i.e., on the interior of a hemetically-sealed liquid-filled case).

Figure 9A:
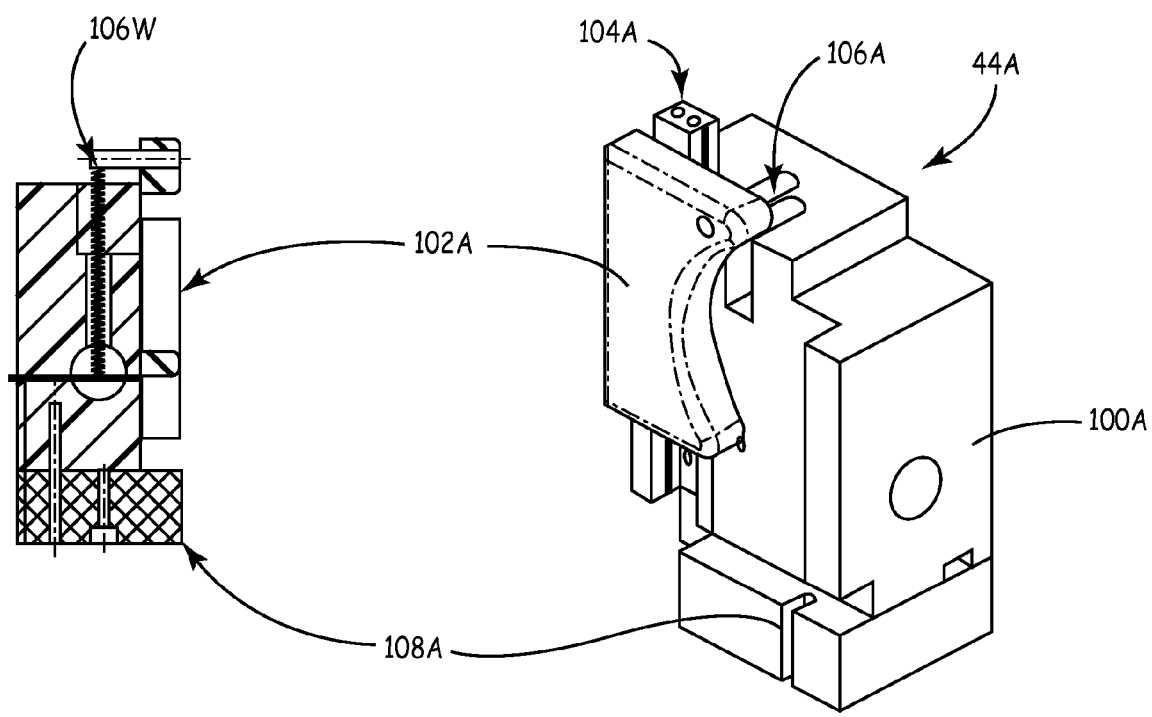
FIG. 9A depicts a perspective view of a jig and side elevation view of said jig, respectively.

FIG. 9A is a perspective view of a first embodiment of a jig 44A, which includes a support structure 100A, a repositionable structure 102A, positioning means 104A for positioning the repositionable structure 102A relative to the support structure 100A, biasing means 106A for biasing the repositionable structure 102A for securing items to the jig 44A, and fixture holder 108A. The jig 44A can be used with the laser welding system 30 for holding and securing components to be welded (e.g., the assembly 90 of FIGS. 4-5).

In the embodiment shown in FIG. 9A, the biasing means 106A is a coiled spring assembly that can bias the repositionable structure 102A in a direction toward the fixture holder 108A. At least a portion of a fixture, such as a fillport (e.g., the fillport 78 shown in FIG. 3), can be placed in the fixture holder 108A. An item, such as a case component for a FEC (e.g., the case component 54 shown in FIG. 2), can be positioned between the support structure 100A and the repositionable structure 102A. The repositionable structure 102A can be moved along the positioning means 104A, which can be a mechanical slide that permits only linear movement. Where an item is positioned between the support structure 100A and the repositionable structure 102A, and a fixture is positioned in the fixture holder 108A, the biasing means 106A generally provides a biasing force to more affirmatively engage the item and the fixture for welding, with a decreased risk of misalignment.

Figure 9B:
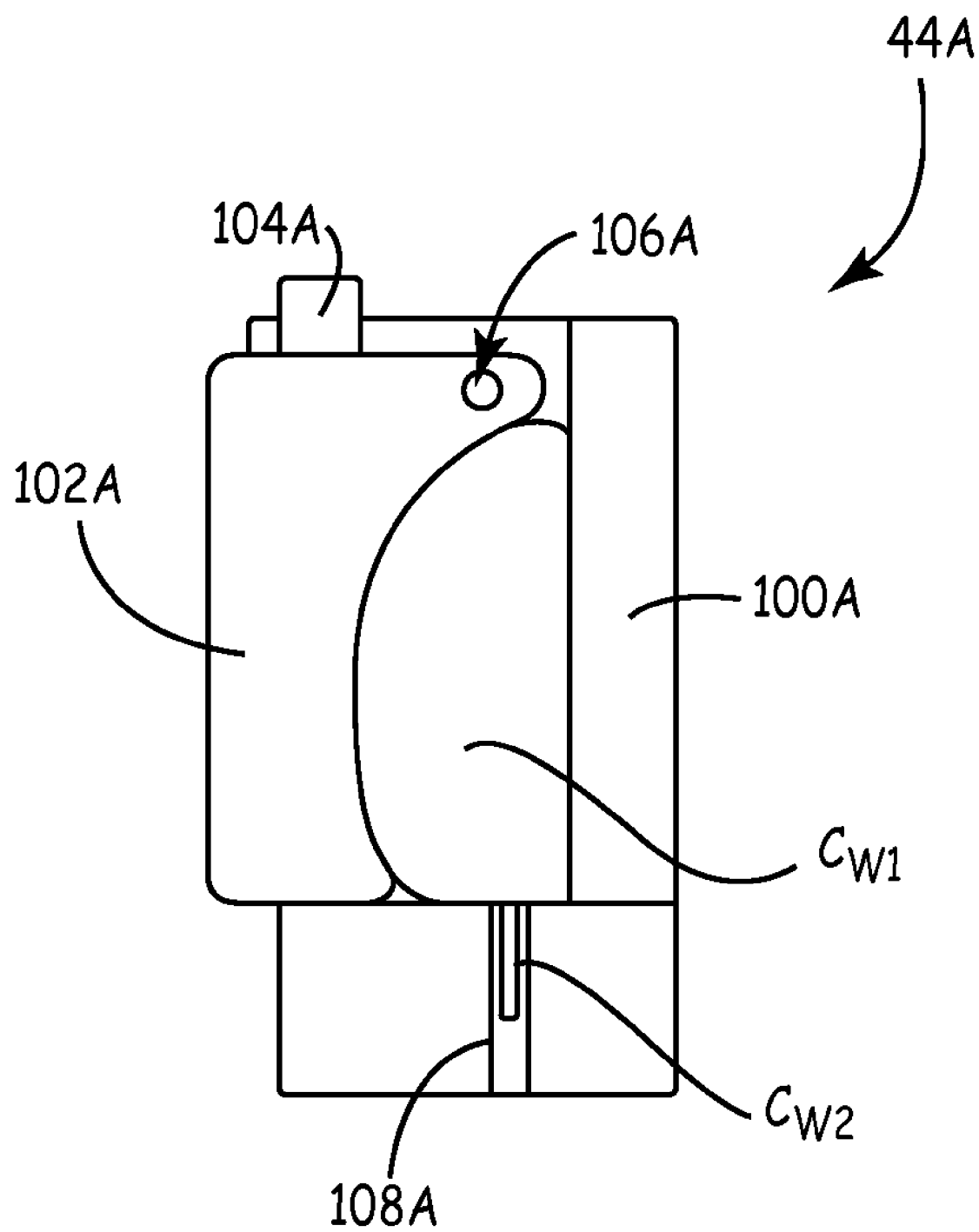
FIG. 9B depicts a perspective view of the jig of FIG. 9A and components to be welded.

FIG. 9B is a perspective view of the of jig 44A with an assembly of components to be welded $C_{w1}$ and $C_{w2}$ engaged thereto. Component $C_{w2}$ is disposed substantially within the fixture holder 108A, and component $C_{w1}$ is disposed between the repositionable structure 102A and the support structure 100A. As shown in FIG. 9B, the components to be welded $C_{w1}$ and $C_{w2}$ are biased against each other. Such biasing facilitates forming a connection weld between the components to be welded $C_{w1}$ and $C_{w2}$.

Figure 10:
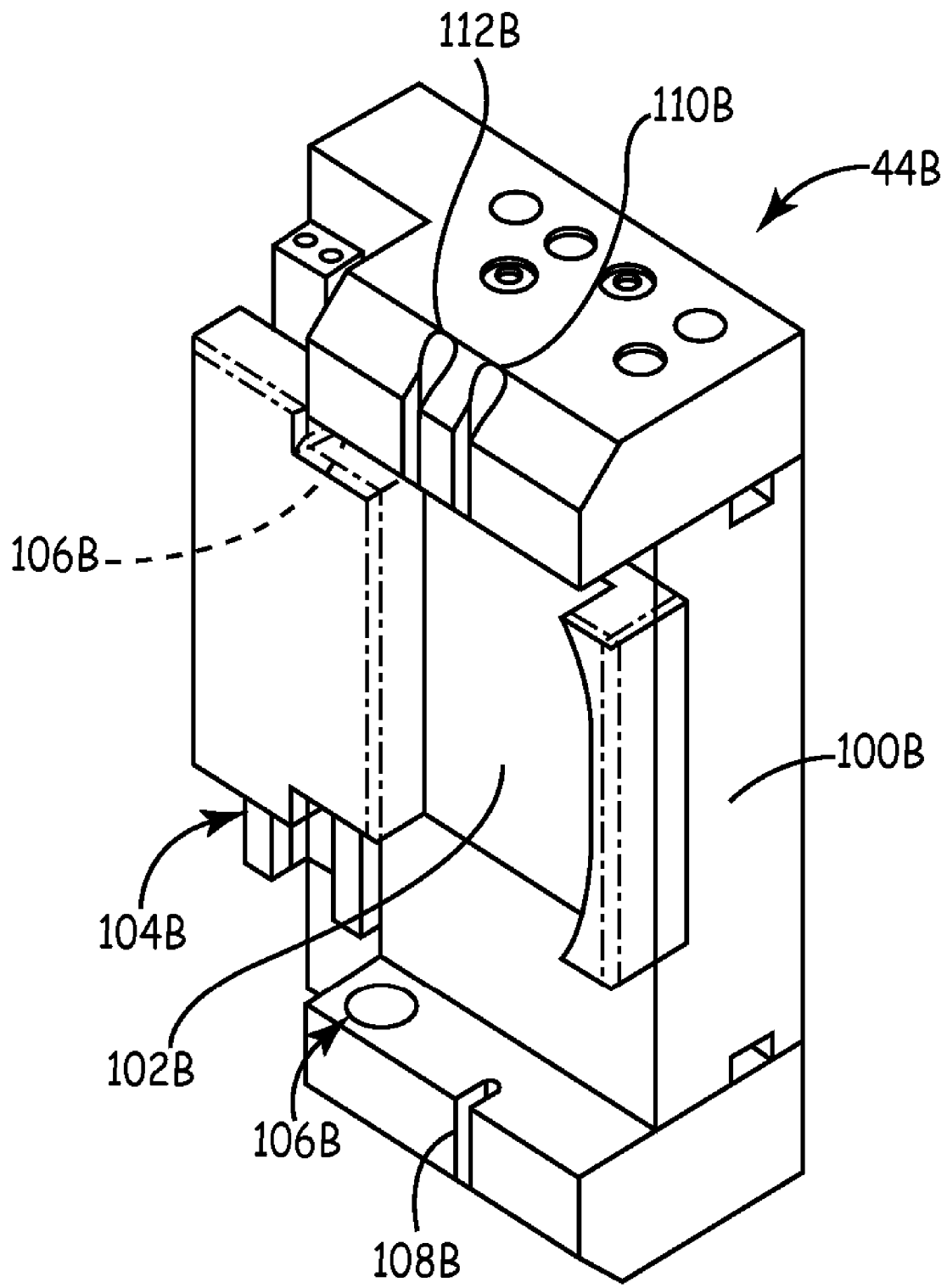
FIG. 10 depicts a perspective view of another jig.

FIG. 10 is a perspective view of another embodiment of a jig 44B, which includes a support structure 100B, a repositionable structure 102B, positioning means 104B for positioning the repositionable structure 102B relative to the support structure 100B, biasing means 106B for biasing the repositionable structure 102B for securing items to the jig 44B, and fixture holders 108B, 110B, and 112B. In the embodiment shown in FIG. 10, the biasing means 106B comprises a magnetic assembly, where magnets provide a biasing force for biasing the repositionable structure 102B in a direction toward either the fixture holder 108B or the fixture holders 110B and 1 12B. The jig 44B generally functions similar to the jig 44A shown and described with respect to FIG. 9. The jig 44B further permits one or more additional fixtures to be placed within the fixture holders 110B and 112B. The repositionable structure 102B can be moved between a first position for providing a biasing force toward the fixture holder 108B and a second position for providing a biasing force toward the fixture holder 110B and 112B.

The jigs 44A and 44B can be made of metallic, ceramic and polymer materials, as well as combinations of those materials. It will be recognized that other embodiments of jigs may be used other than the exemplary jigs shown and described. For example, in lieu of magnetic biasing means, metallic springs, resin-based resilient members, linear actuators, so-called stepper motors, electrical servo-motors, mechanical detents (interlocking structures) and the like can equally serve for the purposes of alignment and retention.

Figure 11:
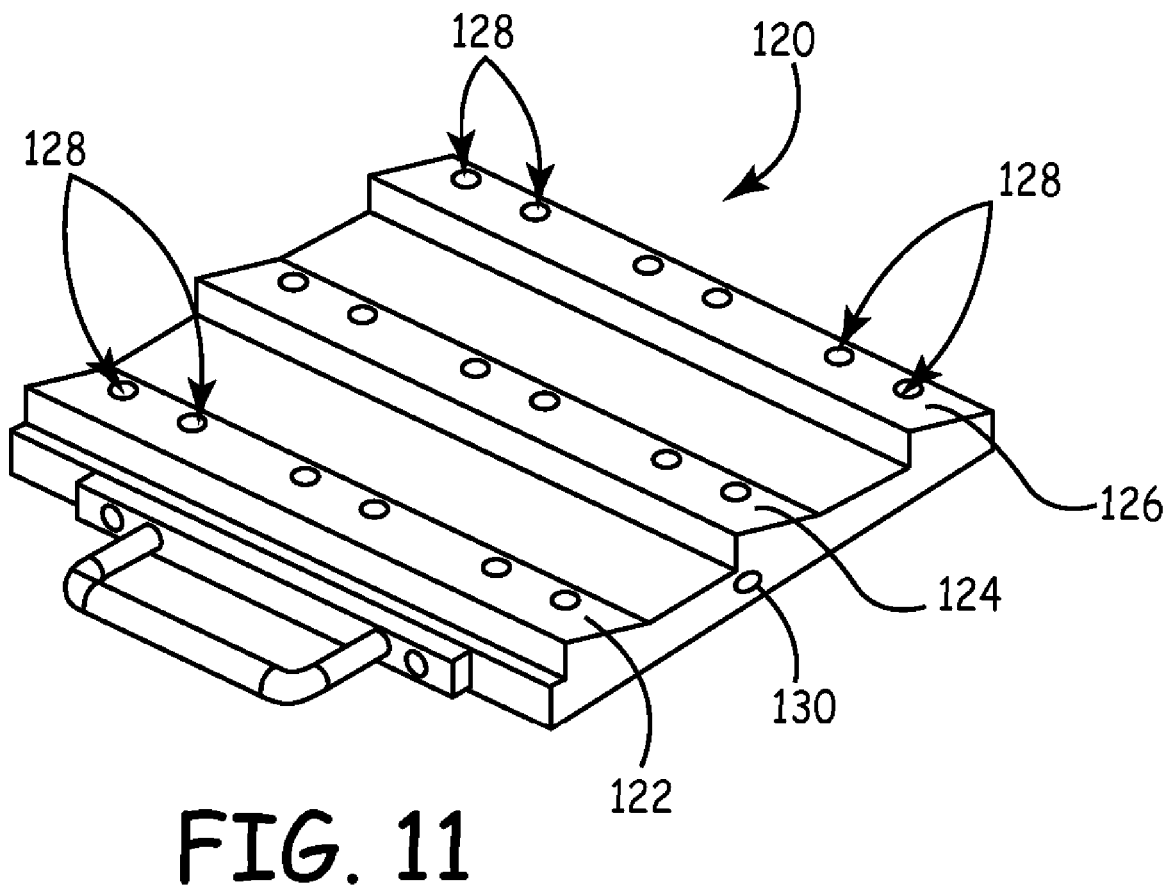
FIG. 11 depicts a perspective view of a pallet.

FIG. 11 is a perspective view of a pallet 120, which includes one or more engagement surfaces 122, 124 and 126, a plurality of jig engagement means 128, and base plate attachment means. The engagement surfaces 122, 124 and 126 are generally disposed at an angle (e.g., 20°). Jigs are positioned at an angle on the engagement surfaces 122, 124 and 126. Items secures in the jigs are likewise disposed at an angle, which enables better positioning of a nozzle of a laser welding system in close proximity to components to weld while still permitting adequate clearance to avoid physical contact with the nozzle. The plurality of jig engagement means 128, such as notched pegs or other means, permit one or more jigs to be quickly and securely engages to associated holes or other engagement means on a pallet.

Figure 12:
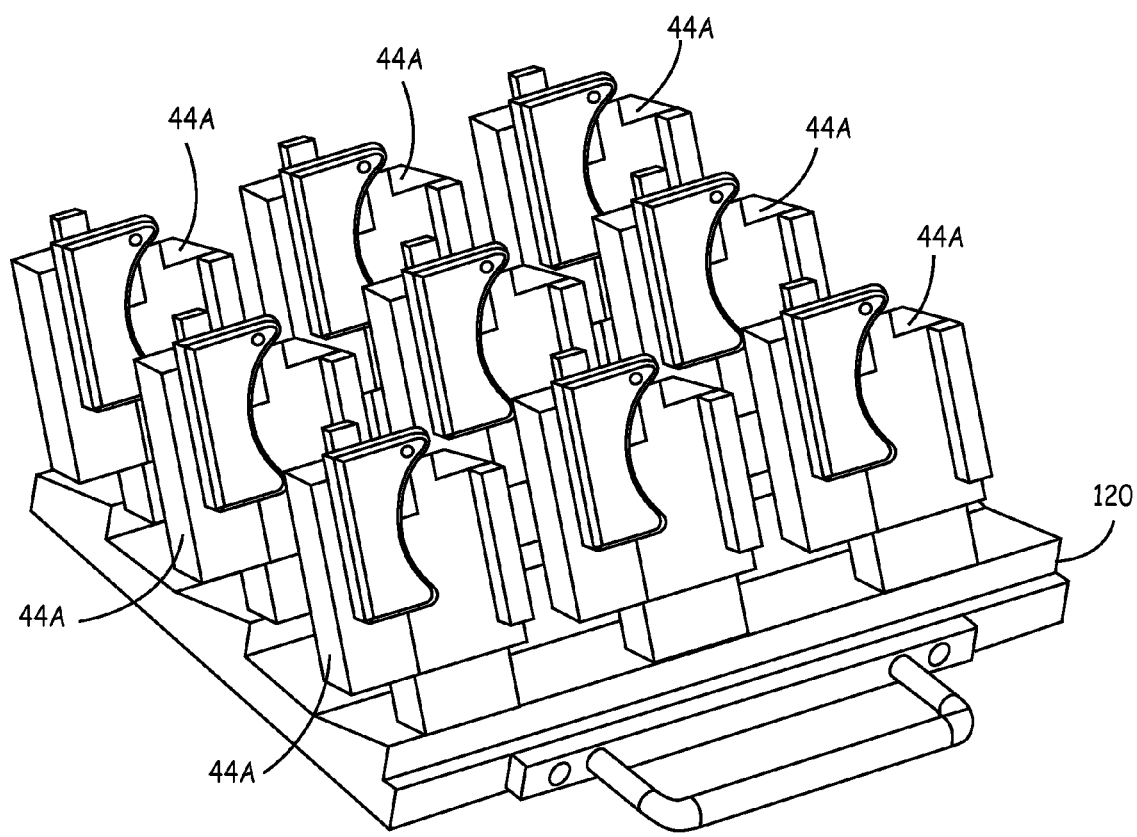
FIG. 12 depicts a perspective view of the pallet of FIG. 11 and a number of jigs.

FIG. 12 is a perspective view of the pallet 120 with a number of jigs 44A engaged thereto. Alternatively, in further embodiments, the pallet 120 can have a substantially flat upper engagement surface and jigs engaged thereon can incorporate a titled or angled portion for positioning components to be welded at an angle relative to a nozzle of a laser welding system. In other words, the jigs and/or the pallet can be used to position the components to be welded relative to a welding system.

In one embodiment, the base plate attachment means 130 includes one or more magnets disposed along an exterior portion of the pallet 120, such as along a perimeter of the pallet 120. Those magnets can be used to form an affirmative engagement of a pallet with other components of a welding system. This allows, for example, the pallet 120 to be magnetically aligned within the laser welding system 30 shown and described with respect to FIG. 1.

Figure 13:
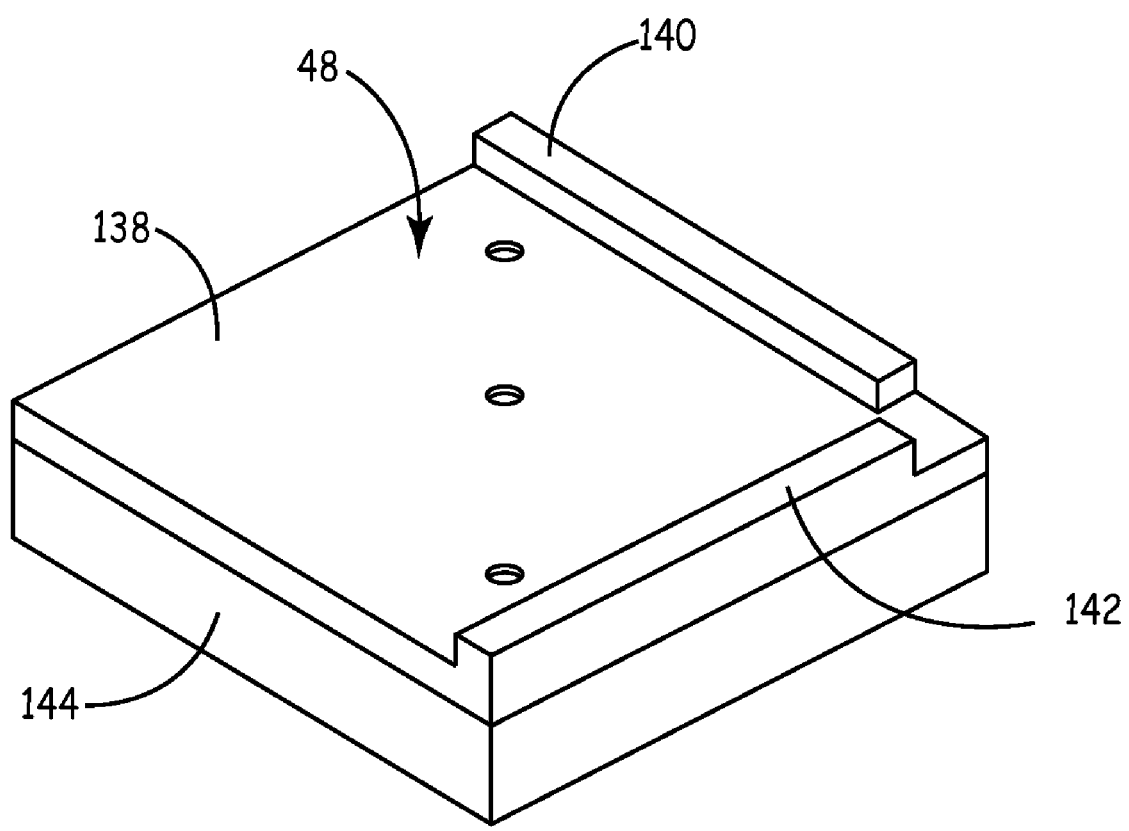
FIG. 13 depicts a perspective view of a base plate.

FIG. 13 depicts a perspective view of a base plate 48, which includes a base 138, and a pair of stops 140 and 142. A pallet (e.g., the pallet 120 shown in FIGS. 11-12) can be positioned on the base 138 of the base plate 48 and rest against the pair of stops 140 and 142. Base plate attachment means on the pallet can be used to affirmatively engage the base plate and to reduce a risk of misalignment therebetween. The base plate 48 can comprise a metallic material for engaging magnets of the attachment means 130 of the pallet 120. In one embodiment, the base plate 48 is connected to a platen 144 for engaging the base plate within a welding system, for example, engaging the base plate to a stage within a laser welding system.

The base plate 48 can be moved in at least X- and Y- (i.e., lateral) and optionally Z-directions within a welding system by a motion controller. Movement of the base plate 48 allows movement of items and components secured thereto, which enables relative movements to be made between a laser beam and components to be welded that are indirectly secured to the base plate 48.

In operation, a substantially circular weld (e.g., the weld 94 shown in FIG. 8) is formed on welded components that are disposed at an angle by positioning welding means along a generally elliptical three-dimensional weld path to form that weld. Creating generally circular welds along exterior portions of welded components is relatively simple, because the welding means can be positioned perpendicular to a connection region where the weld is to be made and there are few problems with obstructions or clearance. It becomes necessary to utilize such an elliptical weld path where the weld is located on an interior portion of the welded components and, during welding, the welding means cannot be disposed perpendicular to a connection region due to inadequate clearance. In such situations the components to be welded $C_w$ must typically be tilted (at an angle other than 90Δ) relative to the welding means. Tilting in that manner means that relative movements between the welding means and the components to be welded $C_w$ will not directly correspond to a desire shape of the complete weld. Stated another way, the weld path will have a different shape than that of the completed weld.

According to the present invention, and with reference to embodiments shown in FIGS. 1-13, a vision system 36 is used to optically sense a connection region between an assembly of at least two components to be welded $C_w$ (e.g., a case component 54 and a fillport 78) and form an image. Then a substantially elliptical path is determined in a three-dimensional space based on the image from the vision system 36. Then a relative movement is initiated between the assembly $C_w$ and the welding means (e.g., a laser beam $L_B$ from a laser welding system 30) such that the welding means is positioned, by relative movement, along the substantially elliptical path to produce a weld between the first component and the second component according to a weld schedule.

The vision system 36 (within the welding system 30) is generally oriented vertically, while components to be welded $C_w$ may be tilted at an angle (i.e., not disposed perpendicular to an orientation of the vision system 36). A substantially circular region to be welded thus appears as a two-dimensional ellipse to the vision system 36.

FIG. 14 is an illustration of an ellipse, shown in two dimensions. The ellipse has a center C, a semimajor axis a, and a semiminor axis b. A line with a length r' is defined between the center C and a point (x, y) on the ellipse. An eccentric angle θ', measured from the center C of the ellipse, is defined between the line having length r' and the semimajor axis a. An eccentricity e of the ellipse, where 0 e<1, is a constant defined as:

$$e \equiv \sqrt{1 - \frac{b^2}{a^2}}$$

A first embodiment of a method of forming a substantially circular weld is as follows. Initially, the vision system 36 locates the center (C) of a substantially elliptical three-dimensional weld path in X, Y, Z Cartesian coordinates, a length of a semimajor axis (a), and a length of a semiminor axis (b). The center (C) can be located automatically (i.e., by generally positioning the vision system near a desired weld path and using the vision system 36 to automatically determine the center), or manual location of a welding path can occur (i.e., cross hairs of the vision system 36 can be manually aligned at two or more points along the welding path, and the center determined from those points). Where a pixel-based vision system is utilized, data is generally converted to inches, or some other unit of measure, for commanding operation of the welding system 30. The weld path can be determined by dynamically detecting a connection region between components to be welded together $C_2$ (e.g., at a joint area) in order to establish the ellipse parameters: the center (C), the length of the semimajor axis (a), and the length of the semiminor axis (b). As a calibrating step for the laser welding system 30, a "test shot" laser beam can be fired with the laser welding system 30 and that "test shot" compared with a location of the center of the elliptical path (C), with relative positioning of the laser welding system 30 then adjusted accordingly to reach the starting point. Moreover, offset constants can be utilized to adjust the semimajor and semiminor axes (a and b) of the weld path as determined by the vision system. Such offset adjustments are used to orient a center of the weld with a radial spacing from a connection region detectable by the vision system (e.g., radially offset from a joint area between components to be welded together $C_w$).

Using information determined the vision system 36, the welding system 30 determines a pattern of discreet weld points along the substantially elliptical three-dimensional weld path. In order to accomplish that, calculations are made using to determine two-dimensional characteristics of the weld path (i.e., X and Y dimension characteristics of the weld path). A first angular increment (θ') from the center (C) of the substantially elliptical weld path is established, in polar coordinates. The angular increment can be, for example, three degrees (3°). A first radial length (r') at the first angular increment (θ') is determined between the center (C) and the ellipse itself. The first radial length (r') is determined by the following equation:

$$r' = \sqrt{\frac{a^2(1-e^2)}{1-e^2\cos^2\theta'}}$$

A first point (x, y) along the substantially elliptical weld path corresponding to where the first radial length (r') intersects the ellipse at the first angular increment (θ') is then determined, in Cartesian coordinates. The following equations are used to convert polar coordinates to Cartesian coordinates:

$$x = r' \cos \theta'$$

$$y = r' \sin \theta'$$

Z-dimension locations can be determined, as part of a weld schedule, by assuming the connection region is tilted at a constant angle a (e.g., 20°) in only one direction (e.g., a slope only in the Y direction). Such an assumption is practical where appropriately standardized tooling is used. A Z-dimension location z for a given point on a substantially elliptical three-dimensional weld path is given by the following equation:

$$z = y \tan \alpha$$

A point on a weld path, such as the first point on the weld path, can thus be located in a three-dimensional Cartesian coordinate system.

Additional points (i.e., a second point, third point, etc.) on the weld path are generally established by adding angular increments and determining associated coordinates in a manner similar to that described above. This is an incremental process that determines three-dimensional coordinate locations for each discreet point along a substantially elliptical three-dimensional weld path.

Next, the welding system 30 is positioned, by relative movement between the welding system 30 and the components to be welded $C_w$, at a starting point on the substantially elliptical three-dimensional path (e.g., a point where the semimajor axis intersects the ellipse in FIG. 14) such that energy (i.e., the laser beam $L_B$ in a laser welding system 30) can be directed at that point. A relative movement between the welding means (i.e., the laser beam $L_B$ in the laser welding system 30) and the substantially elliptical three-dimensional path is initiated for positioning welding means (i.e., the laser beam $L_B$ in the laser welding system 30) at the first point (x, y, z) along the substantially elliptical three-dimensional path. While motion of a stage in a laser welding system 30 may only physically occur in X and Y direction, Z-dimension adjustments can be accomplished using laser focus adjustment and/or z-dimension stage motion, as needed and desired.

The welding means (i.e., a laser beam $L_B$ in a laser welding system 30) can then be repositioned relative to any number of additional points along the weld path. The welding means is incrementally repositioned relative to each discreet point established along the weld path and applies energy to each of those points. Energy from the welding means melts material of the components to be welded $C_w$, which formed a welded connection. The weld path can be a closed polygon (or polyhedron), defined by individual points along the weld path, for creating a seal with the welded connection. The weld path can also have other closed shapes, such as closed shapes including curvilinear portions.

In one embodiment, pulse height of a laser beam $L_B$ used with a laser welding system 30 is ramped-up during early stages of a weld schedule. Ramping-up pulse height means that pulse height (i.e., laser beam intensity) increases over a period of time. The ramp-up can include opening a shutter 34 on the laser welding system 30 and firing laser beam pulses at components to be welded $C_w$ before the pulse height is sufficiently great to melt material on the components to be welded $C_w$, and the increasing the pulse height to a magnitude sufficient to melt material for welding. In addition, pulse height can be ramped-down near completion of a weld schedule. Ramping-down is generally described as the reverse of a ramping-up process.

Typically in embodiments where ramping-up (and/or ramping-down) techniques are used, the laser welding system 30 completes at least one full "trip" or "revolution" along a weld path with the laser beam $L_B$ firing at full pulse height (i.e., at an intensity sufficient to melt material of the component to be welded $C_w$). Further, a weld schedule can include positioning the laser beam $L_B$ over portions of a weld path already traversed. For example, the laser beam $L_B$ can be positioned to fire laser pulses along a weld path for two or more complete "trips" or "revolutions." Those skilled in the art will recognize that a particular weld schedule will vary according to characteristics of a particular application, and use of ramping-up (and/or ramping-down) will vary according to other characteristics of a weld schedule, including pulse width, pulse height, and pulse rate.

In further embodiments, the laser beam $L_B$ of the laser welding system 30 is used only at full pulse height in a binary on/off manner. The shutter 34 can be used to accomplish such on/off operation of the laser system 30.

Thus, according to the present invention two components are connected together with a weld that forms a seal. This invention has many applications, including making sealed connections for medical devices, including encapsulated IMDs. Such medical devices frequently comprise a case structure (or similar component) and one or more fixtures, such as fillports, feedthroughs (e.g., multipolar and single-pin feedthroughs), ferrules, sensors, needles, nozzles, electrical connectors, and similar components, that are connected to the case with a hermetic seal, which can be made according to the present invention.

Although the present invention has been described with reference to preferred embodiments, workers skilled in the art will recognize that changes may be made in form and detail without departing from the spirit and scope of the invention. For example, while the foregoing description of the substantially elliptical three-dimensional weld path refers to the laser welding system 30 of FIG. 1, it will be recognized that other welding means and other configurations of a welding system can be used according the present invention. For example, the present invention can be used to fabricate any liquid-filled electrochemical cell (e.g., primary or secondary batter, aluminum FEC capacitor, wet-slug capacitor having a valve metal anode, etc.) or other implantable device (e.g., an implantable drug pump, infusion pump, etc.). With respect to drug or infusion pumps, the invention can advantageously weld the perimeter of a ferrule surrounding a septum through which a liquid therapeutic agent is periodically injected.

The invention claimed is:

1. A method of connecting two components in an implantable medical device, the method comprising:
   providing an assembly including a first component and a second component;
   sensing optically a connection region between the first component and the second component interior side of the case to produce an image;
   defining a substantially elliptical path in a three-dimensional space based on the image;
   initiating relative movement between the assembly and the laser beam; and
   applying welding means such that the welding means is positioned, by relative movement, along the substantially elliptical path to produce a weld between the first component and the second component, and the welding means occurs inside of the case.

2. The method according to claim 1 and further comprising providing a gas at or near the substantially elliptical path.

3. The method according to claim 1, wherein the weld comprises a substantially circular shape.

4. The method according to claim 1, wherein the welding means comprises a laser welding system.

5. A method of affixing a ferrule-shaped component to a case component, the method comprising:
   initiating relative movement between a laser beam and the case component such that the laser beam follows a substantially elliptical path;
   dynamically adjusting the substantially elliptical path as a function of a shape of a connection region between the ferrule-shaped component and the case component; and
   creating a weld with the laser beam, wherein the weld is positioned inside an interior of the case component.

6. The method according to claim 5, wherein the weld has a substantially circular shape.

7. The method according to claim 5, wherein the case component comprises a portion of one of: a capacitor, a battery, an implantable drug pump, an implantable infusion pump.

* * * * *